(12) United States Patent
Kuzmin et al.

(10) Patent No.: US 8,766,640 B2
(45) Date of Patent: Jul. 1, 2014

(54) AIRBORNE TIME DOMAIN ELECTROMAGNETIC TRANSMITTER COIL SYSTEM AND APPRATUS

(75) Inventors: Petr Valentinovich Kuzmin, Aurora (CA); Edward Beverly Morrison, Aurora (CA)

(73) Assignee: Geotech Airborne Limited, St. Michael (BB)

( * ) Notice: Subject to any disclaimer, the term of this patent is extended or adjusted under 35 U.S.C. 154(b) by 279 days.

(21) Appl. No.: 13/113,582

(22) Filed: May 23, 2011

(65) Prior Publication Data

US 2011/0272522 A1 Nov. 10, 2011

Related U.S. Application Data

(63) Continuation of application No. 12/036,657, filed on Feb. 25, 2008, now Pat. No. 7,948,237.

(51) Int. Cl.
*G01V 3/16* (2006.01)

(52) U.S. Cl.
USPC .......................................... 324/331; 324/330

(58) Field of Classification Search
USPC ................................................ 324/330–331
See application file for complete search history.

(56) References Cited

U.S. PATENT DOCUMENTS

| | | | |
|---|---|---|---|
| 4,641,100 | A | 2/1987 | Dzwinel |
| 6,244,534 | B1 | 6/2001 | Klinkert |
| 2005/0001622 | A1 | 1/2005 | Morrison et al. |
| 2008/0211506 | A1 | 9/2008 | Klinkert |

FOREIGN PATENT DOCUMENTS

| | | |
|---|---|---|
| CA | 2187952 A1 | 4/1998 |
| CA | 2450155 A1 | 5/2004 |
| WO | 2004-046761 A1 | 6/2004 |
| WO | 2005106536 A1 | 11/2005 |

OTHER PUBLICATIONS

"Airborne EM Applied to Sulphide Nickel—Examples and Analysis" Peter VVolfgram, Howard Golden; Key word "Airborne electromagnetic, Nickel Sulphide", 2001.
"Newtem—A novel time-domain helicopter electromagnetic system for resistivity mapping" Perry Eaton, Bob Anderson, Bruno Nilsson, Eric Lauritsen, Steve Queen, Colin Barnett; Newmont Mining Corporation, Englewood, USA, Oct. 2002.
01-01 "60 Years of Airborne EM—Focus on the Last Decade" David Fountain, Formerly Fugro Airborne Surveys, Ottawa, Canada, May 2008.
"AEROTEM*;System Characteristics and Field Results" Paper presented at a Special Session on "New EM Methods" at the 2000 Annual Meeting of the Society of Exploration Geophysicists, Aug. 6-11, 2000 in Calgary, Alta.: Boyko, W. (1), Peterson, N.R.(2), and Kwan, K.(3).

(Continued)

*Primary Examiner* — Bot Ledynh
(74) *Attorney, Agent, or Firm* — Novak Druce Connolly Bove + Quigg LLP (57) ABSTRACT

A tow assembly for an airborne electromagnetic surveying system, including: a transmitter coil frame supporting a transmitter coil, the transmitter coil frame being formed from a plurality of serially connected frame sections forming a loop, the transmitter coil frame having rotating joints at a plurality of locations about a circumference thereof enabling the transmitter coil frame to at least partially bend at the rotating joints; and a suspension assembly for towing the transmitter coil frame behind an aircraft, the suspension assembly being attached to the circumference of the transmitter coil frame at spaced apart locations.

13 Claims, 7 Drawing Sheets

(56) References Cited

OTHER PUBLICATIONS

"Mineral Exploration With the Aero TEM System" S.J.Balch, W.P. Boyko, G. Black, and R.N. Pedersen, AeroQuest Limited, Oct. 2002.

"Aero TEM Characteristics and Field Results" W. Boyko, AeroQuest Limited, Mississauga, Ontario, Canada; N.R.Paterson and K. Kwan, Paterson, Grant, and Watson Limited, Toronto, Ontario, Canada, Oct. 2001.

"Normandy Heli-Borne Time Domain EM System" Graham Boyd; Normandy Exploration: Australia, Aug. 2001.

AIRBORNE TIME DOMAIN ELECTROMAGNETIC TRANSMITTER COIL SYSTEM AND APPRATUS

This application is a continuation of U.S. patent application Ser. No. 12/036,657 filed Feb. 25, 2008, and is related to U.S. patent application Ser. No. 12/919,332.

FIELD OF INVENTION

This invention relates in general to the field of airborne geological mapping. This invention further relates to a system and apparatus for conducting time-domain electromagnetic surveys.

BACKGROUND OF THE INVENTION

There are a variety of known electromagnetic techniques. Geophysical electromagnetic ("EM") techniques can be effective in determining the electrical conductivity of soils, rocks and other conductive material at depths up to about one kilometer. Conductivity distribution with depth is of great interest in mapping base metals and uranium deposits, aquifers and other geological formations. Geophysical EM methods generally involve, generation of a magnetic field by applying a periodic current to a transmitter coil system placed near the earth's surface. This primary magnetic field induces electrical currents in the ground, and the secondary magnetic field produced by these currents is measured to provide information about ground conductivity distributions.

The secondary magnetic field signal may be measured using either a receiver coil system (which can measure up to three orthogonal components of the magnetic field time derivative dB/dt), or a magnetometer (which measures the magnetic field B). The received analog signal may then be amplified', filtered, and digitized by a high-resolution high-speed analog-to-digital converter ("ADC"), and the data may be stored along with the positioning information obtained from a Global Positioning System ("GPS"). Data post-processing can involve electrical and physical modeling of the ground to generate the geophysical conductivity contour maps.

EM measurements can be done either in the frequency domain or time domain. In frequency-domain electromagnetic ("FDEM") measurements, the transmitter coil generally continuously transmits an electromagnetic signal at fixed multiple frequencies, while the receiver coil may measure the signal as a function of time. The measured quantities may include either signal amplitude and phase, or equivalently, the in-phase and in-quadrature amplitudes as a function of frequency. The effective EM penetration depth typically decreases with the square-root of both ground conductivity and excitation frequency.

In time-domain electromagnetic ("TDEM") systems, a pulse of current may be applied to the transmitter coil during an on-period, generating the primary or transmitted EM field, and then switched off during the off period, typically at a repetition rate equal to an odd multiple of half of the local power line frequency. The signal may be measured at the receiver coil as a function of time. The signal amplitude decay during the off-period, combined with modeling of the conductivity and geometry of geological bodies in the ground, may be utilized to yield conductivity contour maps. A time-domain electromagnetic system is described by U.S. Pat. No. 7,157,914 titled "Airborne Electromagnetic Time Domain System, Computer Product and Method", invented by Edward Beverly Morrison, Petr Valentinovich Kuzmin and Pavel Tishin, filed Nov. 20, 2003 and issued on. Jan. 2, 2007.

EM methods can encompass both ground-based and airborne methods. Airborne applications using airplanes and helicopters. Airborne methods may be preferred for large area surveys and have been used for exploration of conductive ore bodies buried in resistive bedrock, geological mapping, hydrogeology, and environmental monitoring. For airborne electromagnetic ("AEM") systems, the data may be acquired while the airplane or helicopter flies at nearly constant speed (up to 75 m/s or 30 m/s, respectively) along nearly parallel equally spaced lines (50 m to 200 m) at close to constant height above ground (about 120 m or 30 m, respectively). Measurements can be taken at regular intervals, typically in the range 1 m up to 100 m.

In designing a helicopter mounted time-domain electromagnetic ("HTEM") system, the mechanical and electrical hardware key specifications may be generally derived from the end-user requirements. These are: high signal-to-noise ratio ("SNR"), high conductance discrimination, and high spatial resolution both laterally and in depth. High signal-to-noise ration can be accomplished by lowering system noise, or by increasing the signal at the receiver coil. One method of increasing the signal means may be increasing the primary magnetic field. For a point far away from the transmitter coil, the magnetic field is proportional to the magnetic dipole moment of the coil and inversely proportional to the cube of the distance from the coil. The magnetic dipole moment of a coil is the product N*I*A (e.g. N×I×A), where N is the number of turns, I is the current, and A is the coil area. The inductance of a coil is proportional to $N^2 \times D$, where N is the number of turns and D is the diameter of the coil. The voltage induced in the receiver coil by a magnetic field B is given by N*A*dB/dt, where the coil sensitivity N×A is the product of the coil number of turns N and the coil area A, and dB/dt is the time-derivative of the magnetic field.

Whenever the survey objective is to map near surface conductivity, a small magnetic dipole moment with fast turn-off may be appropriate, in which case the number of turns in the transmitter coil is generally smaller, thus yielding a reduced magnetic dipole moment and inductance. Conversely, for the detection of conductors at greater depths, it may be desirable to have a longer off-period, and more importantly, to increase the transmitter coil magnetic dipole moment.

Whenever an increase in the magnetic dipole moment may be warranted, it is necessary to increase either the current I, the number of turns N, or the area of the transmitter coil A. The electrical power supply from a single engine helicopter may be limited by the helicopter generator unless an auxiliary power supply is used. In this case, the limiting factor for the amount of current in the transmitter coil is the electrical resistance of the coil and tow cable. For a fixed-length of cable, the power, P, from the helicopter electrical supply is dissipated approximately as the square of the current times the resistance (P=I*I*R). Decreasing the resistance will increase the current by the square root of the decrease. Decreasing the resistance in the loop may be accomplished by heavier gauge wire with its corresponding increase in weight as the electrical resistance is approximately proportional to the length times the resistivity divided by the cross sectional area of the wire. The weight of the transmitter coil is also proportional to the length of the cable, and therefore is proportional to the number of turns N or the square root of the transmitter coil area A. Since the weight of the transmitter coils increases as the square of the current I, and linearly with the number of turns N, and as the square root of the area A, for a given towing weight capacity of the helicopter, the most effective way to increase the magnetic dipole moment of the transmitter coil may be to increase the area A, as opposed to increasing the number of turns N or the current I. Another factor to consider when optimizing the transmitter coil I, N, and A is the requirement of a short turn-off time in time-domain measurements, which thus requires a low inductance of the transmitter coil, the inductance being proportional to the square of N and to the square root of the transmitter coil area.

However, increasing the transmitter coil diameter may reduce aerodynamics and increase drag. Large structures may be stressed during take-off and landing, and therefore there is generally a limit for the size of rigid structures that can be deployed without breaking apart. Reinforcing the structure so that it does not break during take-off and landings may mean an increase in the weight of the structure. Additionally, maintaining the transmitter coil shape during flight can be very important to provide a fixed magnetic dipole moment, in order not to degrade the quality of the measurements. Thus, the requirement for an increased magnetic dipole moment can require careful balancing of all of these factors.

SUMMARY OF THE INVENTION

According to one example embodiment is a tow assembly for an airborne electromagnetic surveying system, including: a transmitter coil frame supporting a transmitter coil, the transmitter coil frame being formed from a plurality of serially connected frame sections forming a loop, the transmitter coil frame having rotating joints at a plurality of locations about a circumference thereof enabling the transmitter coil frame to at least partially bend at the rotating joints; and a suspension assembly for towing the transmitter coil frame behind an aircraft, the suspension assembly being attached to the circumference of the transmitter coil frame at spaced apart locations.

According to another example embodiment is a method for providing a tow assembly for an airborne electromagnetic surveying system, including: providing a transmitter coil; providing a plurality of tubular frame members; serially connecting the plurality of tubular frame members in a loop to form a transmitter coil frame that supports the transmitter coil, with joints between at least some of the tubular frame members permitting rotational movement enabling the transmitter coil frame to at least partially bend in response to forces provided against the transmitter coil support frame; providing a suspension assembly for towing the transmitter support frame behind a helicopter and connecting the suspension assembly at multiple locations about the transmitter coil frame.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

In, the drawings, one embodiment of the invention is illustrated by way of example. It is to be expressly understood that the description and drawings are only for the purpose of illustration and as an aid to understanding, and are not intended as a definition of the limits of the invention.

DETAILED DESCRIPTION OF EXAMPLE EMBODIMENTS

The present invention consists of a large transmitter coil which can be deployed by an aircraft, such as a single engine helicopter, and which may be used in a time-domain electromagnetic system such as an airborne HTEM survey system. There is a need for a transmitter coil in the field of electromagnetic surveying systems having particular features such as size scalability, and a structure that is repairable in the field. The structure of the transmitter of the present invention may be a semi-rigid structure that reduces the likelihood of breakage when it is flown from an aircraft, such as a low-cost small-engine helicopter. Moreover, it may be formed of sections whereby it can be repaired in the field and allow for scalable size of the structure.

Thus the system and apparatus of the present invention may address the interest in exploring base metals and uranium deposits at depths of a certain distance for example those in the range of 1 kilometer. It can encompass a transmitter assembly having a large magnetic dipole moment, that provides flight stability, may be light-weight and therefore compatible with small aircraft, such as single-engine helicopters, and can be transported, set-up and repaired in the field. The transmitter assembly in accordance with this invention may consist of a semi-rigid modular structure that can decrease the incidence of damage or breakage during take-off or landing.

Furthermore the present invention may include a large transmitter coil which can be deployed by a small aircraft, such as a single-engine helicopter and which provides for: adjustment in order to obtain a longer off period and allowing for the augmentation of the magnetic dipole moment of the transmitter coil; as well as a high signal-to-noise ratio ("SNR") receiver coil. All of these features may offer a means of detecting deposits at greater depths.

In one embodiment, the transmitter coil frame of the present invention comprises a semi-rigid modular structure comprised of electrically-insulating polygonal tubes having self-lubricating joints, and a mesh rope suspension system. A receiver coil may be attached centrally in the transmitter coil frame having a separate mesh rope suspension system.

Several embodiments of this invention are possible having varying frame structures comprising a range of configurations, positioning of coils, sizes, materials and weights.

Figure 1:
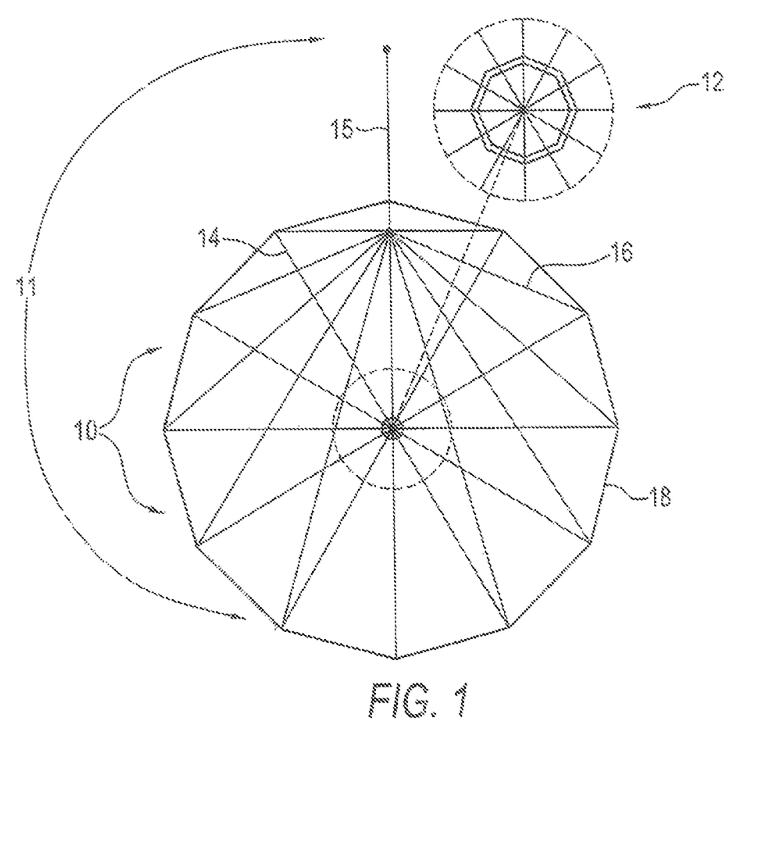
FIG. 1 is a top perspective view of a transmitter coil frame showing the positioning of the receiver coil frame at the center of the frame according to an example embodiment.

As shown in FIG. 1, in one embodiment the transmitter coil support frame 10 may be a polygon, such as a dodecagon, built from tubes constructed of glass fiber, Kevlar or other suitable light-weight and durable materials capable of electrical-insulation. The receiver coil frame 12 which may be octagonal in shape, sits at the centre of the transmitter coil frame 10. The two frames may be connected by a radial system of ropes 14. Both coils may be suspended in a near horizontal position by a suspension system 11, attached to the polygonal transmitter coil frame 10. The transmitter coils may be further attached to a tow rope attachment suspension cable 15, which may be attached to an aircraft for the purpose of suspending the transmitter coil 10 in an airborne position. The suspension system 11 may be constructed of mesh fibers in a manner such as that described in U.S. patent application Ser. No. 11/610,556 filed on Dec. 14, 2006. Of course a person skilled in the art will be aware that other constructions of the suspension system are also possible.

Figure 2:
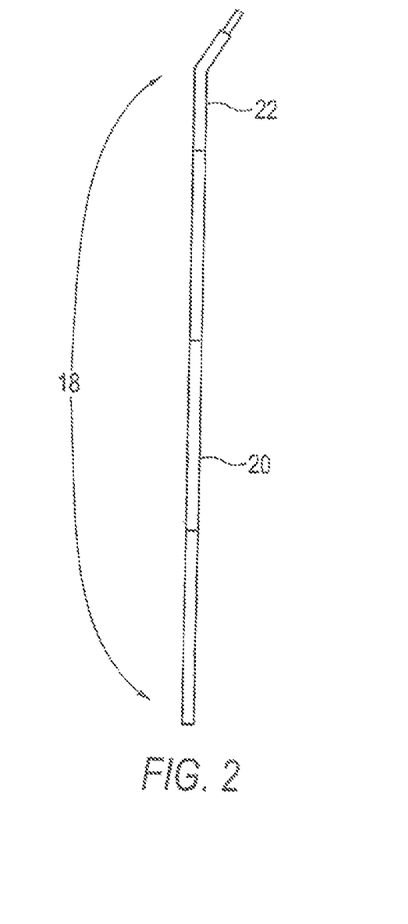
FIG. 2 is a partial top view of the structure of one side of the transmitter coil frame dodecagon.
Figure 3:
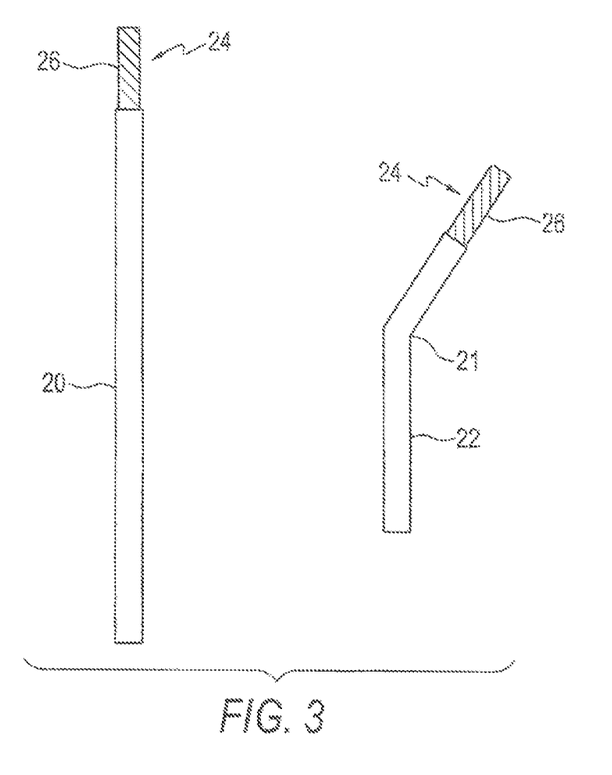
FIG. 3 illustrates the structure of the transmitter coil frame dodecagon in a partial view thereof of a single tube sections, including one section showing a single elbow.

As shown in FIGS. 2 and 3, in one embodiment each of the polygon's sides 18 can consist of straight tubular sections 20, and elbow tubular sections 22 whereby the curve 21, or elbow, in the section may not necessarily be centrally located in the tubular elbow section 22.

In another embodiment, shown in FIG. 3, each of the sections 20 and 22 may have an insert termination tube 24 having an outer diameter 26 protruding at one end. The protruding insert termination tube 24 may be constructed of carbon fiber, lubricated glass fiber or any other material that permits each section to be connected to the adjacent section in a rotatable manner. So that when the transmitter coil frame 10 structure is assembled, each piece can rotate relative to the adjacent pieces about its axis along the side 18 of the polygon. In order to provide or enhance lubrication the protruding insert termination tube 24 may be lubricated with carbon or molybdenum-based spray lubricants, or any other lubricant that allows for the required rotation.

In some example embodiments, the transmitter coil frame 10 may consist of four turns of heavy-duty aluminum electrical wire placed inside the tubular pieces 20 and 22, and be connected by heavy-duty copper cables to the power supply located at the aircraft 28 suspending the transmitter coil in an airborne position, such as a helicopter. In the transmitter coil frame 10, aluminum cabling can be preferable to copper as it may yield a lighter structure having comparable current capacity. The total weight of the system may be of an amount that allows for it to be towed by an aircraft 28, such as a low operating cost small single-engine helicopter.

In one embodiment of the present invention, the transmitter coil may have a maximum current capacity of; for example 250 A with a duty-cycle up to 50%. The magnetic dipole moment of the transmitter coil may have a value of, for example 500,000 $A \cdot m^2$ and an inductance value of, for example 1.5 mH. The receiver coil may have sensitivity N*A, of, for example 500 $m^2$, where N is the number of turns of the wire coil and A is the coil area.

Of course, the current magnetic dipole moment of the transmitter coil, and other functionalities may be altered by external parameters, such as the maximum power available in an aircraft utilized in the invention. Thus, other functionalities and measurements are hereby incorporated in this invention.

Figure 4:
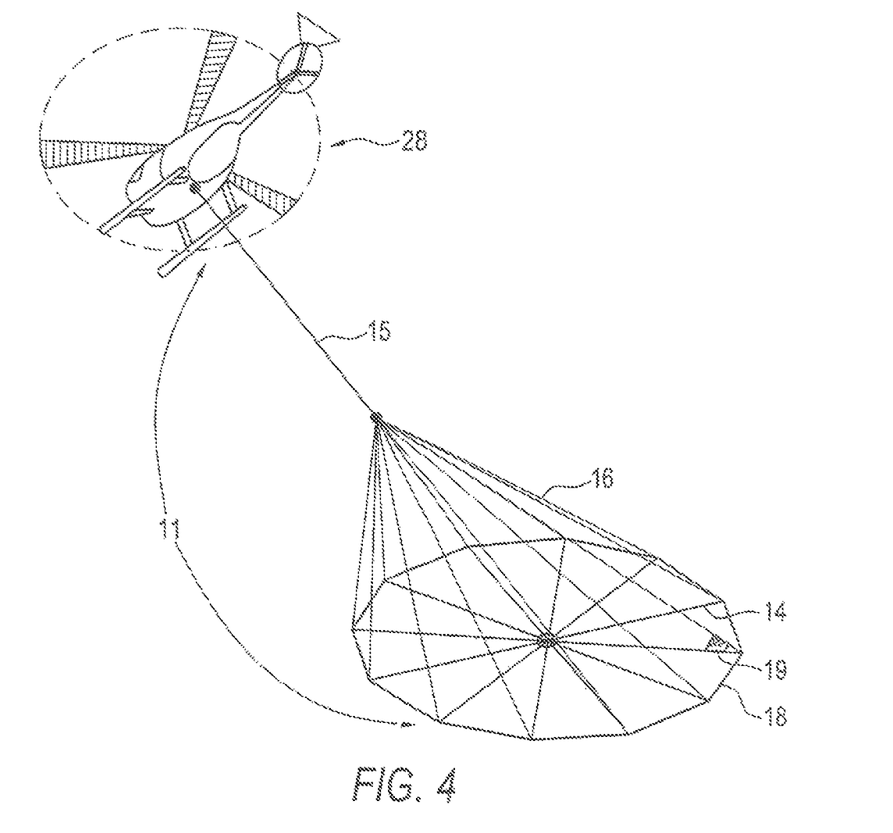
FIG. 4 is a perspective view of the transmitter coil frame and the receiver coil frame in an airborne position in this case towed from a helicopter flying at surveying speeds.

The embodiment shown in FIG. 4 shows the main transmitter coil frame 10 and receiver coil frame as they are positioned in flight for surveying purposes. As shown, the airborne transmitter coil frame 10 may be supported by a suspension system 11, such as a mesh suspension system.

Figure 5:
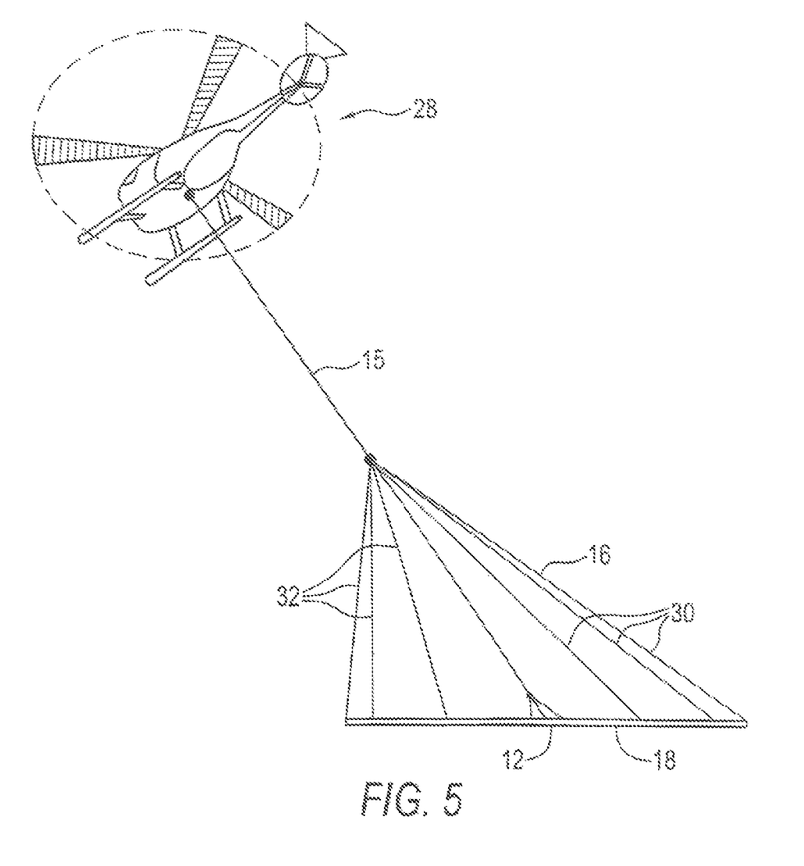
FIG. 5 is a side view of the structure of the transmitter frame and receiver coil in an airborne position in this case towed from a helicopter flying at surveying speeds.

In another embodiments, as shown in FIG. 5, when airborne, the main transmitter coil frame 10 and receiver coil 12 may be positioned so that the suspension system 11 supports the transmitter coil 10 from a point distant from the centre of the coil, and this suspension point may hang from the helicopter by a tow rope attachment suspension cable 15. The length of each suspension cable or rope 16 may be such that when airborne during a flight the transmitter coil frame 10 and receiver coil frame can be in a substantially horizontal position, with the suspension point located at an angle from the vertical. To achieve this position, longer cables or ropes 30 may be positioned at the back and shorter cables or ropes 32 at the front of the suspension system.

The multi-point suspension system structure 11 of the present invention can achieve increased stability to support a preferred flight position. Specifically, the multi-point suspension system structure 11 may produce a drag that maintains the transmitter coil frame 10 in a substantially horizontal position. Although the suspension can produce an overall small drag, the longer ropes positioned at the back 30 may produce a more significant drag than the shorter ropes 32 positioned at the front. This can keep the transmitter coil frame 10 at the proper position and prevent it from rotating about its vertical axis. There may also be a small stabilizing aerodynamic fin 19 on the rear side of the structure, as shown in FIG. 4, to provide additional stability on turns between survey lines.

In yet another embodiment, the transmitter coil frame 10 may be of a relatively large diameter, for example measuring more than 25 m in overall size. This mechanical configuration can minimize the wind-induced vibrations, and can cause the coil to keep its shape during flight. This may allow for the maintenance of a stable magnetic dipole moment, and can act to improve the signal-to-noise ratio at the receiver coil, and therefore enable the probing of conductive formations at larger depths.

In an embodiment of the invention, the articulated tubular segmented polygon structure can be held together and kept stable during flight by the combination of the suspension system 11 and the optimum weight of the transmitter coil electrical cables. The structure may be designed be heavy enough not to flip up when buffeted by the wind during flight, but light enough to be towed by an aircraft 28, such as a single-engine helicopter, as an example weighing about 500 kg. Moreover, the tubes 20 and 22 can be stiff enough such that the structure does not break apart and can withstand the compression forces of the suspension system 11 and the forces applied on this structure when the aircraft 28 is flying. Flight speeds may be, for example from 50 m/s up to 150 m/s.

Figure 6:
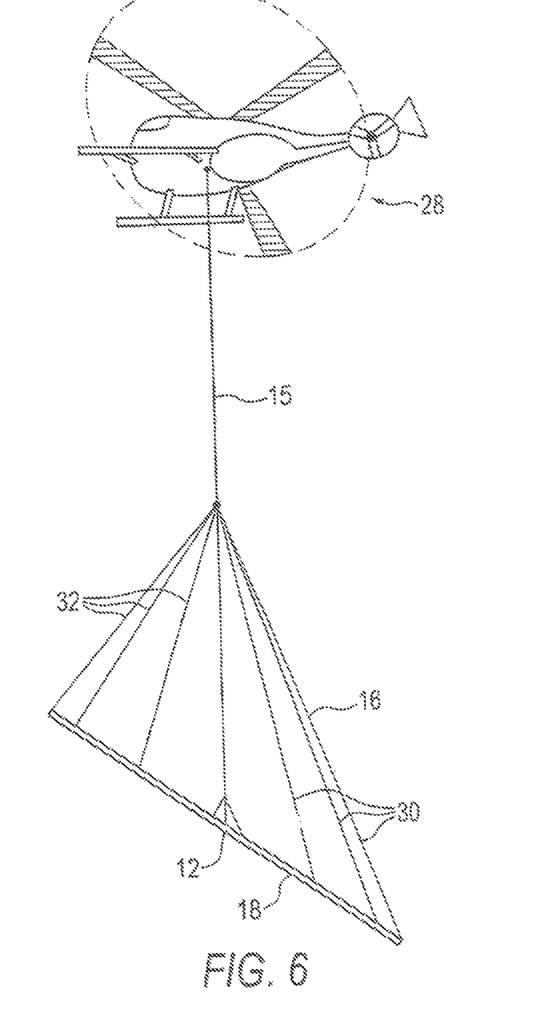
FIG. 6 is a side view of the structure of the transmitter coil frame and receiver coil frame in an airborne position such as is achieved as it is just after take off or before landing.
Figure 7:
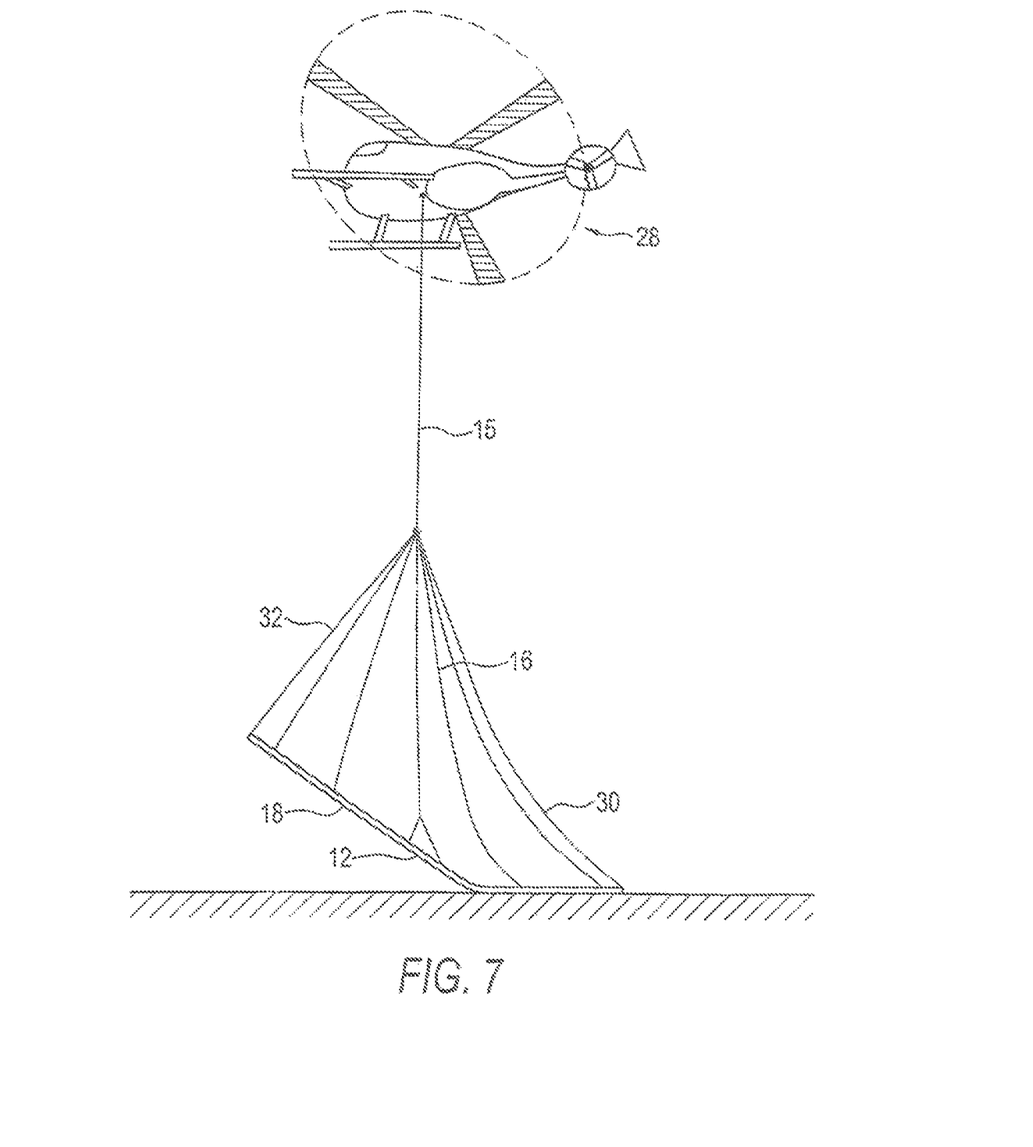
FIG. 7 is a side view of the transmitter coil frame and receiver coil frame in a semi-airborne position in this case towed from a helicopter as it is during take off or landing when a portion of the frame is in contact with the ground.

FIG. 6 shows yet another embodiment of the present invention and the position of the transmitter coil frame 10 and receiver coil frame 12 that may be produced when the aircraft 28, such as a helicopter, is not moving horizontally. This positioning may occur during take-off and landing. In these situations, the transmitter coil frame 10 may not be horizontal with the central axis and rather may be at an angle from the vertical. During landing operations, as the transmitter coil touches the ground, the tubular sections 20 and 22 may rotate, relative to each other. FIG. 7 further shows how the system structure sides 18 can adjust the shape of the transmitter coil frame 10 during landing, by bending the frame which in turn may have the effect of minimizing stress on the structure.

The modular transmitter coil frame 10 may present several advantages over rigid mechanical structures. For example, a traditional large rigid-frame may build-up mechanical stresses that result in breaks occurring during landing. With a semi-rigid structure rotating around its self-lubricating joints, the structural stress may be minimized, and the likelihood of a smooth landing can increase. The semi-rigid modular structure also may make it possible to land the transmitter coil on irregular terrain. This can be an important consideration in surveying mountainous or rugged terrain where the helicopter and landing areas may not be located on level ground.

In another embodiment, the transmitter coil 10 and the receiver coil 12 may be built to a relatively large size, measuring approximately 25 m to 100 m in overall size. The flexibility of the semi-rigid structure, combined with its polygonal shape and proper size for the individual parts, such that it can be disassembled and shipped in standard container, can allow for the building of very large coils capable of being assembled in field, and provide geophysical surveys without breaking the structure during landing and take-off operations.

In yet another embodiment, the modular structure may be disassembled. Each of the sides 18 may be comprised of sections 20 and 22 of a length and width that permits transportation or shipping, for example by standard air freight without requiring special handling. So that the components of the transmitter coil frame 10 may be shipped in containers, such as standard airfreight containers, and assembled in the field. Moreover, the assembly of the structure may be undertaken without the use of tools and completed in a few hours. This assembly can offer the further advantage that if the transmitter coil frame 10 is damaged the either it can be repaired or the damaged piece may be replaced in the field.

It will be appreciated by those skilled in the art that other variations of the embodiments described herein may also be practiced without departing from the scope of the invention. Other modifications are therefore possible. For example, the structure can be scaled up to produce larger magnetic dipole moments compatible with the requirements of the specific survey using helicopters with towing capacity larger than single-engine helicopters to achieve probing of ground conductivity at the required depths. Moreover, the transmitter coil structure may be constructed of a variety of materials, as may the suspension system allowing for the tensile strength, lubricated rotatability, and light weight structure described above.

What is claimed is:

1. A tow assembly for an airborne electromagnetic surveying system, comprising:
    a transmitter coil frame supporting a transmitter coil, the transmitter coil frame being formed from a plurality of serially connected frame sections forming a loop, the transmitter coil frame having joints at a plurality of locations about a circumference thereof enabling at least portions of the connected frame sections to at least partially rotate about a long axes thereof such that the transmitter coil frame to at least partially bend about its circumference to adjust during landing contact with a ground surface to reduce stress on the transmitter coil frame; and
    a suspension assembly for towing the transmitter coil frame behind an aircraft, the suspension assembly being attached to the circumference of the transmitter coil frame at spaced apart locations.

2. The tow assembly of claim 1 wherein the tow assembly includes a plurality of radial ropes that each extend outward from a central region to a respective location on the circumference of the transmitter coil frame.

3. The tow assembly of claim 2 comprising a receiver coil frame supporting a receiver coil, the receiver coil frame being supported by the plurality of radial ropes with the receiver coil substantially concentric with the transmitter coil.

4. The tow assembly of claim 1 wherein the suspension assembly has a shorter vertical height at a leading side thereof than a trailing side thereof thereby supporting the transmitter coil frame in a substantially horizontal position at a desired flight speed.

5. The tow assembly of claim 1 wherein the suspension assembly comprises a tow rope for attachment to an aircraft and a plurality of suspension ropes, the suspension ropes each having an upper end attached to an end of the tow rope and a lower end connected to a respective one of the spaced apart locations about the circumference of the transmitter coil frame.

6. The tow assembly of claim 5 wherein the lengths of the suspension ropes attached to a trailing portion of the transmitter coil frame are longer than the suspension ropes attached to a leading portion of the transmitter coil frame.

7. The tow assembly of claim 1 wherein the joints of the transmitter coil frame are rotating joints between at least some of the serially connected frame sections.

8. The tow assembly of claim 7 wherein the rotating joints between at least some of the serially connected frame sections are lubricated.

9. The tow assembly of claim 7 wherein the rotating joints are each formed by a male portion of one of the transmitter frame sections received within a corresponding female portion of another of the transmitter frame sections.

10. The tow assembly of claim 9 wherein the frame sections are tubular sections that collectively define a continuous internal coil passage in which the transmitter coil is received.

11. The tow assembly of claim 10 wherein the tubular sections include straight tubular sections and elbow tubular sections.

12. The tow assembly of claim 10 wherein the transmitter coil frame has multiple sides that collectively define a polygonal shape.

13. The tow assembly of claim 12 wherein multiple straight tubular sections are included in each side of sides.

* * * * *